United States Patent
Yamanaka

[11] Patent Number: 5,982,732
[45] Date of Patent: Nov. 9, 1999

[54] OPTICAL HEAD HAVING MULTIPLE LIGHT SOURCES HAVING DIFFERENT WAVELENGTHS

[75] Inventor: Yutaka Yamanaka, Tokyo, Japan

[73] Assignee: NEC Corporation, Tokyo, Japan

[21] Appl. No.: 08/928,393

[22] Filed: Sep. 12, 1997

[30] Foreign Application Priority Data

Sep. 24, 1996 [JP] Japan ................................. 8-251492

[51] Int. Cl.$^6$ ....................................................... G11B 7/12
[52] U.S. Cl. ........................................ 369/112; 369/44.37
[58] Field of Search ................................... 369/112, 116, 369/110, 94, 95, 44.12, 44.14, 44.37

[56] References Cited

U.S. PATENT DOCUMENTS

| 5,526,338 | 6/1996 | Hasman et al. ....................... 369/94 X |
| 5,737,300 | 4/1998 | Ota et al. ................................. 369/112 |

FOREIGN PATENT DOCUMENTS

| 0747893A2 | 11/1996 | European Pat. Off. . |
| 0803867A2 | 10/1997 | European Pat. Off. . |
| 62-257641 | 11/1987 | Japan . |
| 5-210868 | 8/1993 | Japan . |
| 6-20291 | 1/1994 | Japan . |
| 06259804 | 9/1994 | Japan . |
| 6-259804 | 9/1994 | Japan . |
| 6-325405 | 11/1994 | Japan . |
| 08 055363 | 2/1996 | Japan . |
| 8-221798 | 8/1996 | Japan . |

OTHER PUBLICATIONS

European Search Report dated Mar. 25, 1998.

*Primary Examiner*—Muhammad Edun
*Attorney, Agent, or Firm*—McGinn & Gibb.P.C.

[57] ABSTRACT

An optical head includes a fixed optical system having a first light source for outputting a first collimated light having a first wavelength, a first detection system for receiving a reflection of the first collimated light from a first optical disk having a first substrate thickness, a second light source outputting a second collimated light parallel to the first collimated light and having a second wavelength different than that of the first wavelength, and a second detection system for receiving a reflection of the second collimated light from a second optical disk having a second substrate thickness different than that of the first substrate thickness. A movable optical system includes an objective lens for focusing the first light on the first optical disk, and for focusing the second light on the second optical disk and an optical system for converting a wavefront of the second light and transmitting the second light to the objective lens. A driving system moves the movable optical system in a direction relative to the first collimated light.

30 Claims, 4 Drawing Sheets

OPTICAL HEAD HAVING MULTIPLE LIGHT SOURCES HAVING DIFFERENT WAVELENGTHS

BACKGROUND OF THE INVENTION

1. Field of the Invention

The present invention relates to an optical head for an optical disk device which records and reproduces information by using light, and more particularly to an optical head which includes a plurality of light sources having different wavelengths.

2. Description of the Related Art

To protect the information recording layer of an optical disk, exit light from an objective lens is converged onto a minute spot when recording or reproducing information on or from the optical disk. The objective lens is designed to form the smallest possible spot for an optical disk having a substrate of a particular thickness.

Recently, to improve recording density etc., optical disks having different substrate thicknesses have been standardized. However, conventional single-light source optical systems cannot accommodate such different substrate thicknesses. Therefore, optical systems for accommodating two different substrate thicknesses have been developed.

FIG. 6 shows an example of such a two-light-source optical system. This configuration accommodates two different substrate thicknesses by using two light sources having different wavelengths.

Specifically, exit light from a first light source 1 is shaped by a collimator lens 13 and an objective lens 6, to form a minute spot on an optical disk 7 having a first substrate thickness. Reflection light from the optical disk is guided by a beam splitter 14 to a first detection system 3, which detects necessary information.

On the other hand, an integrated module 17 incorporates a second light source whose wavelength is different from that of the first light source. Exit light from the integrated module 17 is superimposed on an optical path extending from the first light source by a wavelength combining element 10. In this case, a minute spot can be formed on a second optical disk 8 having a second substrate thickness different from that of the first optical disk. Reflection light from the optical disk is separated by the wavelength combining element 10, and a necessary signal is detected by a second detection system that is provided in the integrated module 17.

Thus, the configuration shown in FIG. 6 accommodates optical disks having different substrate thicknesses by employing two light sources having different wavelengths and establishing different objective lens incident states.

However, the optical head shown in FIG. 6, is larger than the conventional single-light source optical head because the number of parts required is much greater than that of the conventional single-light source optical head. As a result, such a larger structure is more difficult to move, and hence high-speed access of the entire optical disk with a two-light-source optical head, is difficult to achieve.

To remedy the slow movement of large optical heads, a separation-type optical head is conventionally used. A conventional separation-type optical head has a structure in which the optical system is divided at a position between the objective lens and a collimator lens, so that typically only the objective lens is moved in the optical axis direction. The separation-type optical head takes into account that a variation in distance between the collimated light portion and the objective lens does not affect the optical characteristics of the head.

However, a separation-type optical head cannot be used with the head shown in FIG. 6, because the second light source is not collimated. That is, since exit light from the second light source (which is indicated by broken lines) incorporated into module 17, is not collimated between the collimating lens 13 and the objective lens 6, the optical characteristics of the second light would be changed by a variation in the distance, which would prevent a minute spot from being formed on the second optical disk. Thus, the reproduced or recorded signal from/on the optical disk would deteriorate.

SUMMARY OF THE INVENTION

In view of the foregoing and other problems of the conventional systems, an object of the present invention is to provide a structure for a two-wavelength separation-type optical head in which collimated light beams from two light sources having different wavelengths, form through a single objective lens minute, focused spots on optical disks having different thicknesses.

In a first aspect of the present invention, an optical head includes a fixed optical system that includes a first light source outputting a first collimated light having a first wavelength, a first detection system for receiving a reflection of the first collimated light from a first optical disk having a first substrate thickness, a second light source outputting a second collimated light parallel to the first collimated light and having a second wavelength different than that of the first wavelength, and a second detection system for receiving a reflection of the second collimated light from a second optical disk having a second substrate thickness different than that of the first substrate thickness.

Further, a movable optical system is provided having an objective lens for focusing the first light on the first optical disk and for focusing a second light on the second optical disk, and an optical system is provided for converting a wave of the second collimated light and transmitting the second collimated light to the objective lens. The first collimated light and the second collimated light travel between the fixed optical system and the movable optical system. Additionally, a driving system moves the movable optical system in a direction parallel to the first collimated light and the second collimated light.

In the first embodiment, the movable optical system further includes a wavelength combining element for combining the first collimated light and the second collimated light and outputting a combined light to the objective lens. The first collimated light and the second collimated light are output from the fixed optical system at different positions.

In a second aspect of the invention, an optical head includes a fixed optical system including a first light source for outputting a first collimated light having a first wavelength, a first detection system for receiving a reflection of the first collimated light from a first optical disk having a first substrate thickness, a second light source for outputting a second collimated light having a second wavelength different than that of the first wavelength, a second detection system for receiving a reflection of the second collimated light from a second optical disk having a second substrate thickness different than that of the first substrate thickness, and a wavelength-combining element for combining the first collimated light and the second collimated light.

A movable optical system includes a wavelength-selective wavefront conversion element for converting a wavefront of the second collimated light and transmitting a second light, and an objective lens for focusing the first collimated light on the first optical disk and for focusing the second light, received from the wavelength-selective wavefront conversion element, on the second optical disk.

In a third aspect of the invention, an optical head includes a fixed optical system including a first light source for outputting a first light having a first wavelength, a second light source for outputting a second light having a second wavelength different than that of the first wavelength, a wavelength-combining element for combining the first light and the second light, a collimator lens for collimating the first light and the second light from the wavelength-combining element, to produce first collimated light and second collimated light, a first detection system for receiving a reflection of the first collimated light from a first optical disk having a first substrate thickness, a second detection system for receiving a reflection of the second collimated light from a second optical disk having a second substrate thickness different than that of the first substrate thickness.

A movable optical system includes a wavelength-selective wavefront conversion element for converting a wavefront of the second collimated light and transmitting a second light, and an objective lens for focusing the first collimated light on the first optical disk and for focusing the second light, received from the wavelength-selective wavefront conversion element, on the second optical disk.

In a fourth aspect of the present invention, an optical head is provided including a fixed optical system including a first light source for outputting a first light having a first wavelength, a second light source for outputting a second light having a second wavelength different than that of the first wavelength, a wavelength-combining element for combining the first light and the second light; and a collimator lens for collimating the first light and the second light, to produce first collimated light and second collimated light, respectively, and a shared detection system for receiving a reflection of the first collimated light from a first optical disk having a first substrate thickness, and for receiving a reflection of the second collimated light from a second optical disk having a second substrate thickness different than that of the first substrate thickness.

A movable optical system of this embodiment of the present invention includes a wavelength-selective wavefront conversion element for converting a wavefront of the second collimated light and transmitting a second light, and an objective lens for focusing the first collimated light on said first optical disk and for focusing the second light, received from the wavelength-selective wavefront conversion element, on the second optical disk.

In a fifth aspect of the present invention, an optical head includes a fixed optical system and a movable optical system. The fixed optical system includes a first light source for outputting a first light having a first wavelength, to be collimated to produce a first collimated light, and a first detection system for receiving a reflection of the first collimated light from a first optical disk having a first substrate thickness.

The movable optical system includes a second light source for outputting a second, non-collimated light and having a second wavelength different than that of the first wavelength, an objective lens for focusing the first collimated light on the first optical disk and for focusing the second non-collimated light on the second optical disk, and a second detection system for receiving a reflection of the second non-collimated light from a second optical disk having a second substrate thickness different than that of the first substrate thickness. The second light source and the second detection system are preferably provided in a single module to reduce the size of the movable optical system.

In yet another aspect of the invention, an optical head is provided for transferring data to and from different optical disks and for compensating for different substrate thicknesses of the different optical disks. The optical head includes a fixed optical system for outputting a first light and a second light, wherein the first light includes a collimated light and the second light includes a collimated light and has a wavelength different from that of the first light. A movable optical system is provided for receiving the first light and the second light and including a mechanism for focusing the first light on an optical disk having a first thickness, and for focusing the second light on an optical disk having a second thickness different than that of the first thickness.

With the unique and unobvious structure and technique of the present invention, a separation-type optical head is optimally used, such that both light sources are collimated. Thus, the optical characteristics of the light (including the second light) are not changed by a variation in the distance, and thus with the invention a minute spot can be formed on the second optical disk. Hence, distance (substrate thickness differences) variations in the present invention are irrelevant to its operation, since the invention utilizes collimated light, not non-collimated light as in the conventional systems. Moreover, such can be achieved by a relatively small and easily movable, high-speed access optical head system.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
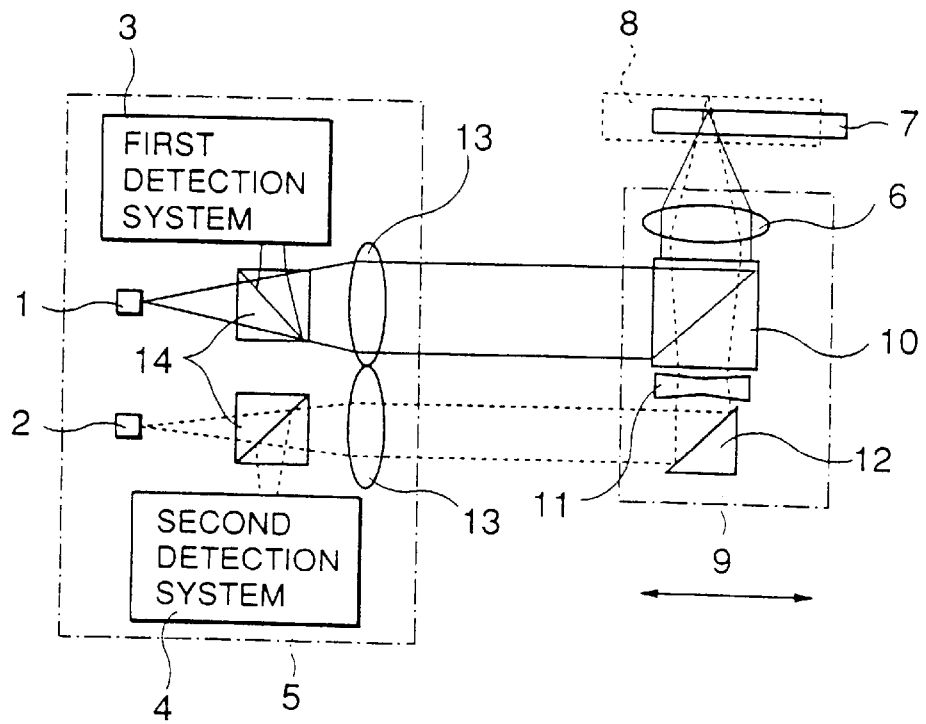
FIG. 1 is a schematic drawing of a two-light-source optical head according to a first embodiment of the present invention.

A detailed description of the invention will be made with reference to the drawings. To aid understanding of the invention, similar reference numerals are used for similar items throughout the drawings.

Referring to FIG. 1 which shows a first embodiment of the present invention, light from a first light source 1 is converted into collimated light by a collimator lens 13, reflected by a wavelength combining device 10, and then shaped by an objective lens 6, to form a minute spot on a first optical disk 7.

Reflection light from the first optical disk 7 travels along the same optical path in the opposite direction, and is separated by a beam splitter 14, so as to be guided to a first detection system 3. The first detection system 3 detects a focusing error signal, a tracking error signal, an information signal, and other signals, as is known in the optical disk art. It is noted that while the invention is applicable and optimized for optical disk technology such as a digital video disk (DVD) having a thickness for example, of 0.6 mm, a compact disk-read-only memory (CD-ROM) having a thickness, for example, of 1.2 mm, a so-called "mini disk", or the like, other media and systems having different substrate thicknesses also may utilize advantageously the present invention.

The conventional methods of signal and error detection, such as the knife-edge method or the push-pull method, can be used with the invention, and are well known to those ordinarily skilled in this art field, and will not be discussed herein for the sake of brevity.

Figure 6:
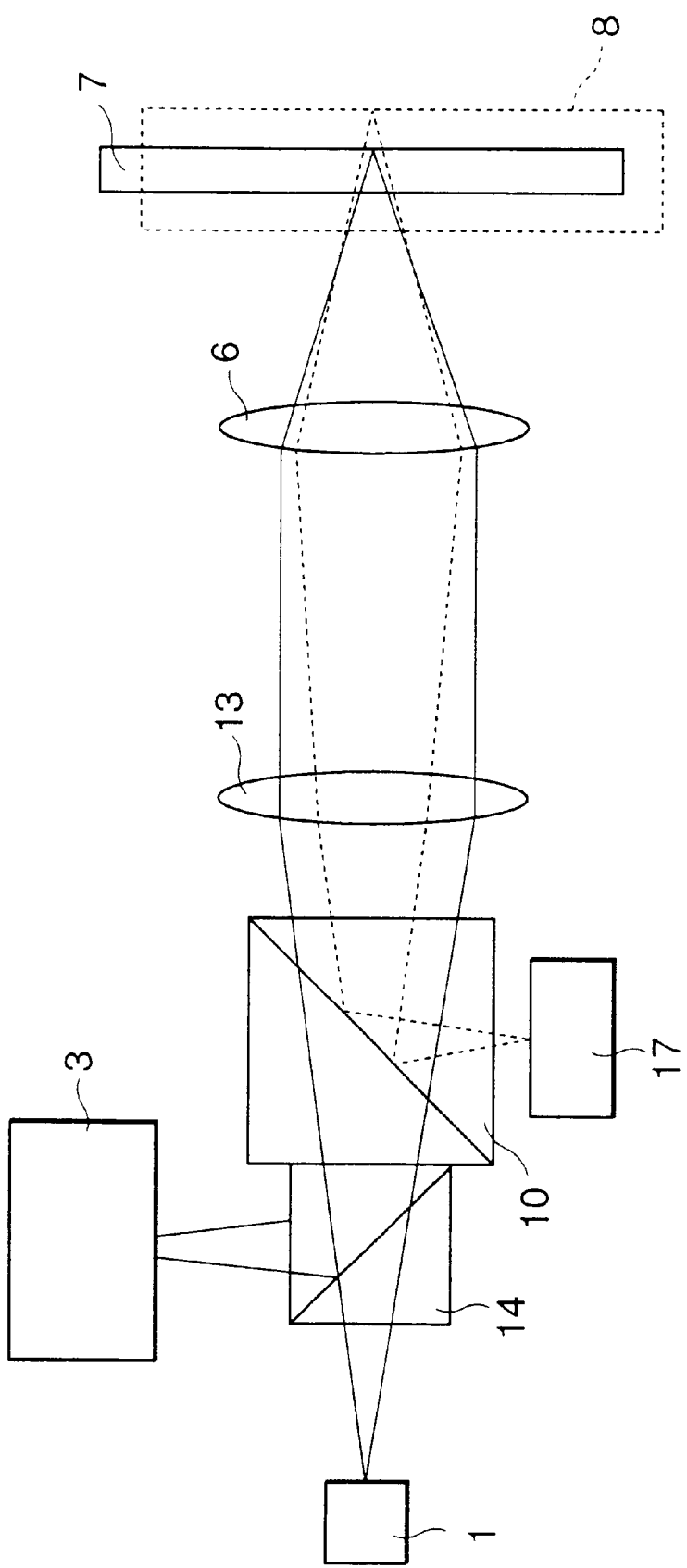
FIG. 6 is a schematic drawing of a conventional two-light-source optical head.

When a second optical disk 8 having a different substrate thickness than that of the first optical disk 7 is used instead of the first optical disk 7, the light from a second light source 2 is converted into collimated light by a collimator lens 13, reflected by a mirror 12, and then input to a wavefront conversion element 11 (preferably comprising a holographic optical element having a concentric hologram pattern or the like) which converts the wave surface of the collimated light so that it is properly focused by the objective lens 6 to form a minute spot on the second optical disk's 8 substrate. The structure of such a holographic optical element is described in detail in "Dual Wavelength Optical head for 0.6 mm and 1.2 mm Substrate Thicknesses", Ryuichi Katayama et al., *Jpn. Journal of Applied Physics*, Vol. 36, (1997), pp. 460–466, Part 1, No. 1B, January 1997, incorporated herein by reference. The second light is passed through the wavefront conversion element 11 while the first light is not. Without element 11, the second light would form a minute spot at the same position where the first light forms a minute spot. In the movable system of FIG. 1, only four elements constitute the movable system, as compared to the system of FIG. 6, in which elements 1, 3, 6, 13, 14, and 17 form the movable system. Thus, the second spot is formed at a second position, by using the element 11.

The two collimated beams of light output from the collimating lenses 13 are parallel to one another.

The resulting light is passed through the wavelength combining element 10, and shaped by the objective lens 6, to form a minute spot on a second optical disk 8. Reflection light from the second optical disk 8 travels along the same optical path in the opposite direction, and is separated by a beam splitter 14 so as to be guided to a second detection system 4. The second detection system 4 similarly detects a focusing error signal, a tracking error signal, an information signal, and other signals.

The wavelength combining device 10, discussed above, is a conventional device well known to those ordinarily skilled in this art field and, for example, could be a beam splitter, wavelength filter or the like having a multilayered interference film. The wavelength combining device 10 operates similarly to a beam splitter, such that some light is passed and other light is reflected.

As is well known to those ordinarily skilled in this art field, a glass lens or a hologram element can be used as the wavefront conversion element 11. The beam splitters 14 are also well known elements to those ordinarily skilled in this art field and could include, for example, a polarizing beam splitter combined with a quarter-wave plate.

The light sources 1, 2, the detection systems 4, 5, the collimator lenses 13, and the beam splitters 14 are provided in a fixed optical system 5, whereas the objective lens 6, the wavelength combining element 10, the mirror 12, and the wavefront conversion element 11 are provided in a movable optical system 9.

The movable optical system 9 is movable only along the optical axis direction of collimated light beams, or the radial direction of the optical disks 7 and 8. A conventional drive mechanism (not illustrated) including a voice coil motor or a screw can be used, for example, as a moving mechanism to move the movable optical system 9.

In this first embodiment, each of the light beams is a collimated light beam which permits the movable optical system to be moved freely without affecting the optical characteristics of the optical head. Thus, as mentioned above, the first embodiment of the present invention takes into account that only non-collimated light is affected by distance, and that distance does not vary the optical characteristics of collimated light. As a result, the optical characteristics of the signals do not deteriorate and substrates having different thicknesses can be accommodated.

Second Embodiment

Figure 2A:
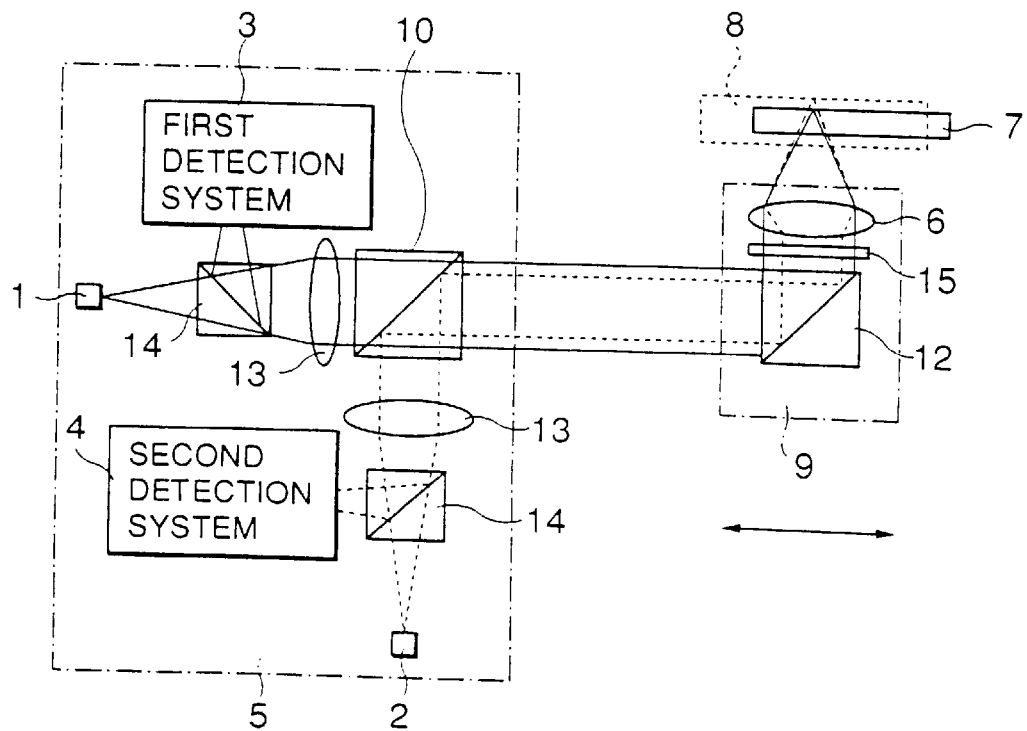
FIG. 2A is a schematic drawing of a two-light-source optical head according to a second embodiment of the present invention.

Referring now to FIG. 2A, a second embodiment of the invention is illustrated, in which the fixed optical system is simplified by positioning the wavelength-combining element 10 between the beam splitters 14 and a movable optical system 9.

In FIG. 2A, the light from a first light source 1 is converted into collimated light by a collimator lens 13, passed through a wavelength-combining element 10, reflected by a mirror 12, passed through a wavelength-selective wavefront conversion element 15, and then shaped by an objective lens 6, to form a minute spot on a first optical disk 7.

Reflection light from the first optical disk 7 travels along the same optical path in the opposite direction, and is separated by a beam splitter 14, so as to be guided to a first detection system 3. The first detection system 3 detects a focusing error signal, a tracking error signal, an information signal, and other signals, as mentioned above.

The light from a second light source 2 is converted into collimated light by a collimator lens 13, superimposed on the optical path extending from the first light source by the wavelength-combining device 10, reflected by the mirror 12, and then input to the wavelength-selective wavefront conversion element 15 which operates as described above to accommodate for the different substrate thickness of the second optical disk 8. The resulting light is shaped by the objective lens 6, to form a minute spot on the second optical disk 8. In the second embodiment, the movable optical system 9 has only three components (e.g., elements 12, 15, and 6), and thus is lighter than that of the first embodiment.

Reflection light from the second optical disk 8 travels along the same optical path in the opposite direction, and is separated by a beam splitter 14, so as to be guided to a second detection system 4.

Figure 2B:
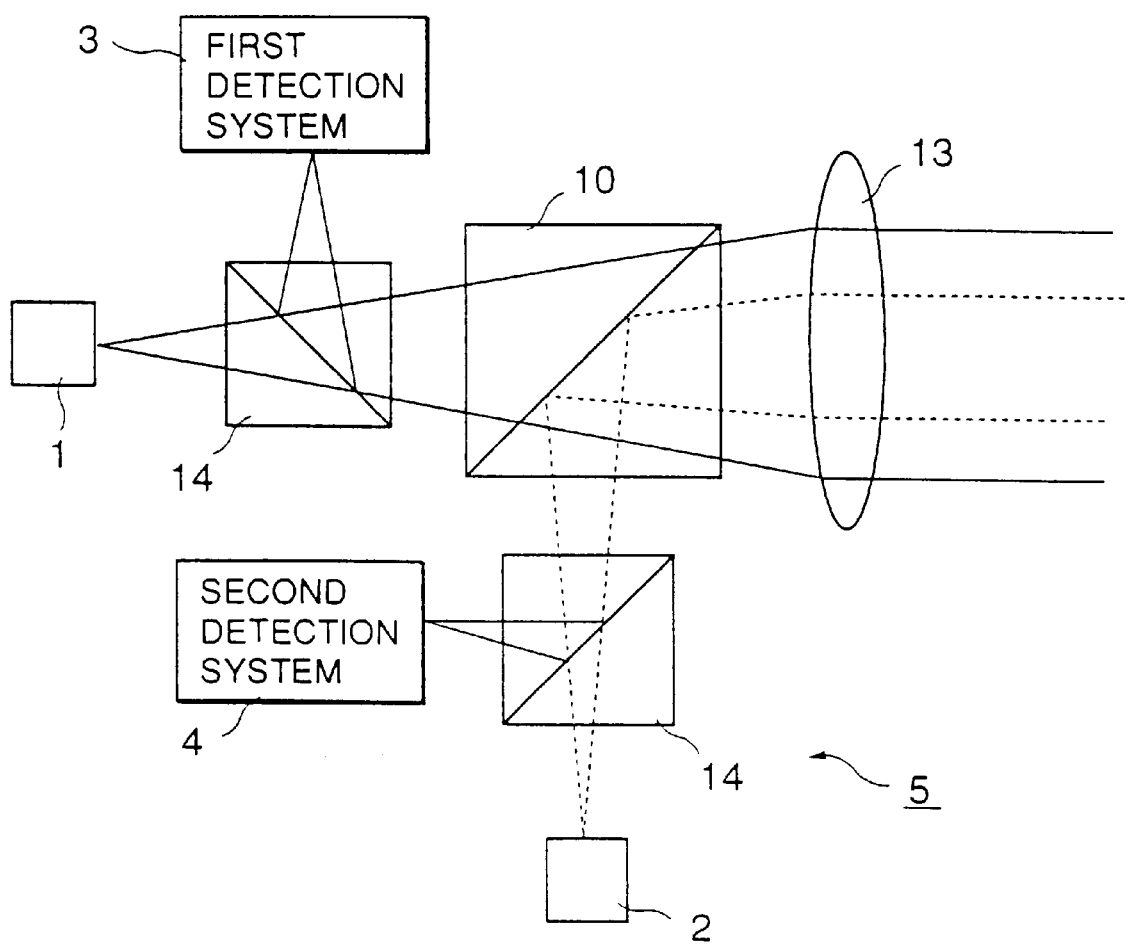
FIG. 2B is a schematic drawing of a two-light-source optical head according to a modification of the second embodiment of the present invention.

It is noted that, in a modification of the second embodiment, the number of collimator lenses in the fixed optical system 5 could be reduced to one by positioning the wavelength combining device 10 between the collimator lens 13 and the beam splitters 14, as shown in FIG. 2B. Thus, such a modification results in a less complex and smaller system.

Further, an integrated module (discussed in detail below with respect to FIG. 5) could be used in which the light source and the detection optical system are integrated to further reduce the number of parts and the corresponding size and weight of the optical head.

The wavelength-selective wavefront conversion element 15 has no effect on the wavelength of the first light source 1, and converts only the wave surface of the wavelength of the second light source 2. For example, a relief hologram element can be used as such a wavefront conversion element. The above characteristic can be realized by a hologram element which satisfies the following equation:

$$(n-1)h/\lambda_1 = m$$

$$(n-1)h/\lambda_2 = k+0.5,$$

(where m, k are arbitrary integers).

In the above equation, h is the lattice height of the hologram element, n is the refractive index of the element, and $\lambda_1$ and $\lambda_2$ are wavelengths of the first and second light sources, respectively. The above equation is explained in greater detail in "Dual Wavelength Optical head for 0.6 mm and 1.2 mm Substrate Thicknesses", Ryuichi Katayama et al., *Jpn. Journal of Applied Physics,* Vol. 36, (1997), pp. 460–466, Part 1, No. 1B, January 1997, incorporated herein by reference.

In this second embodiment, the objective lens 6, the wavelength-selective wavefront conversion element 15, and the mirror 12 are provided in the movable optical system 9, and the remaining parts are provided in the fixed optical system 5. This structure allows the movable optical system to be made smaller when compared to the first embodiment, because the wavelength combining element 10 is moved to the fixed optical system 5. As discussed above, a smaller movable system 9 moves faster and provides the optical head with quicker response characteristics.

Third Embodiment

Figure 3:
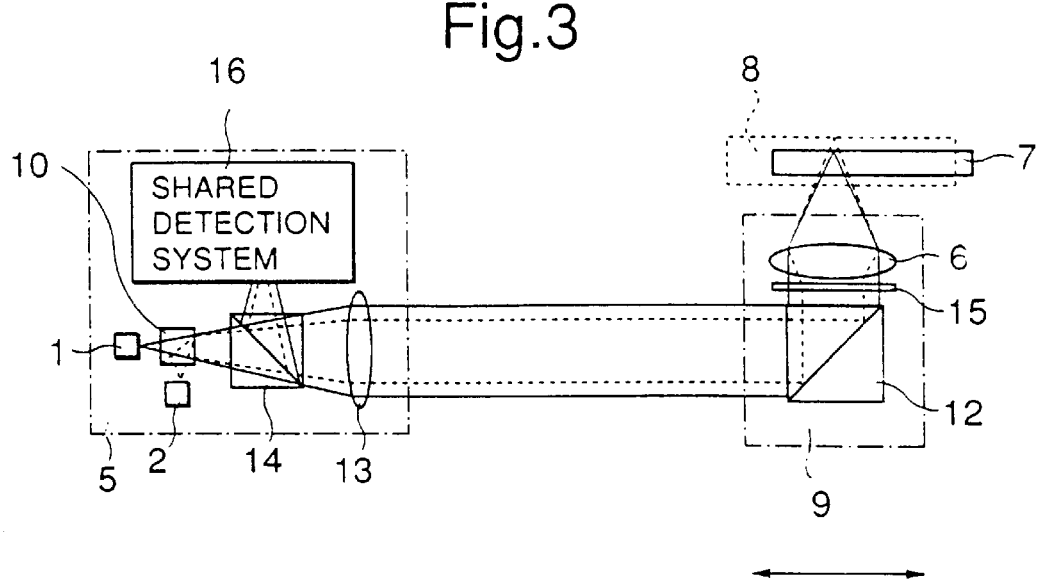
FIG. 3 is a schematic drawing of a two-light-source optical head according to a third embodiment of the present invention.

Referring to FIG. 3, a third embodiment of the invention is illustrated. In the second embodiment (as shown in FIG. 2A), the fixed optical system is simplified by positioning the wavelength-combining element 10 between the beam splitter 14 and the first and second light sources, 1, 2, respectively, as shown in FIG. 3. This results in a more compact and lightweight system.

The third embodiment is further different than the second embodiment in that the third embodiment uses a shared detection system 16, instead of first and second detection systems. This structure further results in a more compact and lightweight system having a higher access speed. Briefly, the operation of the shared detection system 16 is the same as the first detection 3 of FIG. 1 (as well as that of the embodiment of FIG. 5 discussed briefly below).

One detection system such as the first detection system may be used for the first and second light because the first and second optical disks are not used simultaneously (e.g., only one disk is usable at a time). Namely, the first light is off when the second light is on and vice versa.

Figure 4:
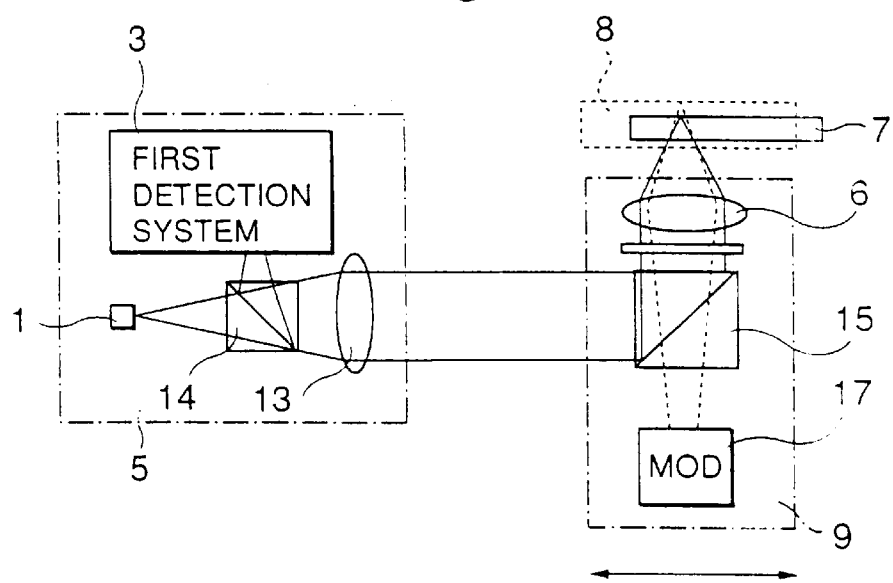
FIG. 4 is a schematic drawing of a two-light-source optical head according to a fourth embodiment of the present invention.

The embodiments of FIGS. 2A (and 2B) and 3 are preferable since the fewest number of elements are included in the movable system, and therefore these embodiments are the lightest, making access speed the quickest. The modified second embodiment of FIG. 2B is light since it uses the same movable optical system as that of FIG. 2A, and it also has the added advantage of having a relatively smaller fixed optical system since only one collimator lens is employed in the fixed optical system. FIG. 4 discussed below forms the heaviest of the movable systems.

Fourth Embodiment

A fourth embodiment of the invention is shown in FIG. 4. Specifically, the second light source 17 and the wavelength-combining element 10 are positioned in the movable optical system 9, as opposed to both first and second light sources and the wavelength-combining element 10 being in the fixed optical system, as in the second and third embodiments described above. The fixed optical system 5 and the movable optical system 9 are related to each other only by the collimated light from the first light source 1.

To minimize the size of the light source provided in the movable optical system 9, preferably an integrated module 17 is used in which the light source is integral with the detection system (e.g., see the discussion below regarding the integrated module below of FIG. 5). This configuration is advantageous in that the collimator lens and the wavefront-conversion element can be omitted by properly setting the distance between the light source and the objective lens. This configuration eliminates the need for a collimator lens 13, in that the second light is shaped by the objective lens 6 to form a minute spot on the recording layer of the second disk 8 by setting the distance between the second light source and the objective lens 6. Therefore, a collimator lens for the second light is unnecessary.

Figure 5:
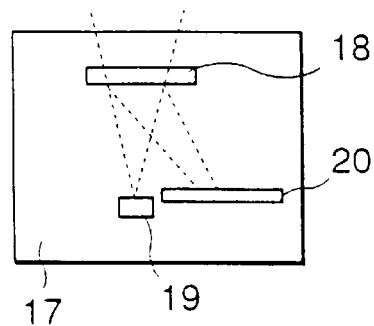
FIG. 5 is a schematic drawing of an integrated module according to the invention.

Referring now to FIG. 5, an integrated module 17 is illustrated in detail. The integrated module 17 includes a light source 19 and a photodetector 20. The light from the light source 19 is directly output from the integrated module 17. A hologram element 18 directs the incoming light signal to the photodetector 20. As mentioned above, the hologram element 18 will affect only the incoming light, but will not affect the outgoing light from the light source.

As described above, a two-wavelength separation type optical head is provided according to the present invention which accommodates optical disks having different substrate thicknesses and utilizes a fixed optical system and a movable optical system to make the movable parts of the head lighter and to increase the operating speed of the optical head.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. An optical head, comprising:
   a fixed optical system including:
      a first light source for outputting a first collimated light having a first wavelength;
      a first detection system for receiving a reflection of said first collimated light from a first optical disk having a first substrate thickness;
      a second light source for outputting a second collimated light having a second wavelength different than that of said first wavelength; and
      a second detection system for receiving a reflection of said second collimated light from a second optical disk having a second substrate thickness different than that of said first substrate thickness; and
   a movable optical system including:
      an objective lens for focusing said first collimated light on said first optical disk, and for focusing said second collimated light on said second optical disk; and an optical system for converting a wavefront of said second collimated light, and transmitting said second collimated light to said objective lens.

2. The optical head as in claim 1, wherein said movable optical system further comprises a wavelength-combining element for combining said first collimated light and said second collimated light, and for outputting a combined light to said objective lens, said first collimated light and said second collimated light being output from said fixed optical system at different positions.

3. The optical head as in claim 2, further comprising:
a driving system for moving said movable optical system in a direction parallel to said first collimated light and said second collimated light, said second collimated light being parallel to said first collimated light,
wherein said first collimated light and said second collimated light travel between said fixed optical system and said movable optical system.

4. An optical head comprising:
a fixed optical system including:
    a first light source for outputting a first collimated light having a first wavelength;
    a first detection system for receiving a reflection of said first collimated light from a first optical disk having a first substrate thickness;
    a second light source for outputting a second collimated light having a second wavelength different than that of said first wavelength;
    a second detection system for receiving a reflection of said second collimated light from a second optical disk having a second substrate thickness different than that of said first substrate thickness; and
    a wavelength-combining element for combining said first collimated light and said second collimated light; and
a movable optical system comprising:
    a wavelength-selective wavefront conversion element for converting a wavefront of said second collimated light and transmitting a second light; and
    an objective lens for focusing said first collimated light on said first optical disk and for focusing said second light, received from said wavelength-selective wavefront conversion element, on said second optical disk.

5. The optical head as in claim 4, further comprising:
a driving system for moving said movable optical system in a direction parallel to one of said first collimated light and said second collimated light,
wherein said first collimated light and said second collimated light travel between said fixed optical system and said movable optical system.

6. The optical head as in claim 4, wherein said fixed optical system includes a first collimator lens positioned between said first detection system and said wavelength-combining element, and a second collimator lens positioned between said second detection system and said wavelength-combining element.

7. An optical head comprising:
a fixed optical system including:
    a first light source for outputting a first light having a first wavelength;
    a second light source for outputting a second light having a second wavelength different than that of said first wavelength;
    a wavelength-combining element for combining said first light and said second light;
    a collimator lens for collimating said first light and said second light from said wavelength-combining element, to produce first collimated light and second collimated light;
    a first detection system for receiving a reflection of said first collimated light from a first optical disk having a first substrate thickness;
    a second detection system for receiving a reflection of said second collimated light from a second optical disk having a second substrate thickness different than that of said first substrate thickness; and
a movable optical system comprising:
    a wavelength-selective wavefront conversion element for converting a wavefront of said second collimated light and transmitting a second light; and
    an objective lens for focusing said first collimated light on said first optical disk and for focusing said second light, received from said wavelength-selective wavefront conversion element, on said second optical disk.

8. The optical head as in claim 7, further comprising:
a driving system for moving said movable optical system in a direction parallel to one of said first collimated light and said second collimated light,
wherein said first collimated light and said second collimated light travel between said fixed optical system and said movable optical system.

9. The optical head according to claim 7, wherein said fixed optical system further comprises a first beam splitter positioned between said first detection system and said wavelength-combining element, and a second beam splitter positioned between said second detection system and said wavelength-combining element.

10. An optical head comprising:
a fixed optical system including:
    a first light source for outputting a first light having a first wavelength;
    a second light source for outputting a second light having a second wavelength different than that of said first wavelength;
    a wavelength-combining element for combining said first light and said second light; and
    a collimator lens for collimating said first light and said second light, to produce first collimated light and second collimated light, respectively; and
    a shared detection system for receiving a reflection of said first collimated light from a first optical disk having a first substrate thickness, and for receiving a reflection of said second collimated light from a second optical disk having a second substrate thickness different than that of said first substrate thickness; and
a movable optical system comprising:
    a wavelength-selective wavefront conversion element for converting a wavefront of said second collimated light and transmitting a second light; and
    an objective lens for focusing said first collimated light on said first optical disk and for focusing said second light, received from said wavelength-selective wavefront conversion element, on said second optical disk.

11. The optical head as in claim 10, wherein said fixed optical system further comprises a beam splitter positioned between said wavelength-combining element and said collimator lens, and
wherein said wavelength-combining element receives said first light and said second light directly from said first light source and said second light source, respectively.

12. The optical head as in claim 10, further comprising:
a driving system for moving said movable optical system in a direction parallel to said first collimated light and said second collimated light, said second collimated light being parallel to said first collimated light,
wherein said first collimated light and said second collimated light travel between said fixed optical system and said movable optical system.

13. An optical head comprising:
a fixed optical system including:
  a first light source for outputting a first light having a first wavelength, for collimation to produce a first collimated light; and
  a first detection system for receiving a reflection of said first collimated light from a first optical disk having a first substrate thickness; and
a movable optical system including:
  a second light source for outputting a second, non-collimated light and having a second wavelength different than that of said first wavelength;
  an objective lens for focusing said first collimated light on said first optical disk and for focusing said second non-collimated light on said second optical disk; and
  a second detection system for receiving a reflection of said second non-collimated light from a second optical disk having a second substrate thickness different than that of said first substrate thickness.

14. The optical head as in claim 13, wherein said fixed optical system further comprises a collimator lens for receiving said first light and for producing said first collimated light, and
wherein said movable optical system further comprises:
  a wavelength-combining element for receiving said first collimated light from said collimator lens of said fixed optical system and for receiving said second non-collimated light from said second light source, and for providing an output to said objective lens.

15. The optical head as in claim 14, further comprising:
a driving system for moving said movable optical system in a direction parallel to said first collimated light,
wherein said second light source is positioned at a predetermined distance from said objective lens such that said second light, without collimation, is shaped by said objective lens into a minute spot on said second optical disk.

16. The optical head as in claim 13, wherein said second light source and said second detection system are integrated into a single module.

17. An optical head for transferring data to and from different optical disks and for compensating for different substrate thicknesses of said different optical disks, comprising:
a fixed optical system for outputting a first light and a second light, wherein said first light comprises a collimated light said second light comprises a collimated light and has a wavelength different from that of said first light; and
a movable optical system for receiving said first light and said second light and including means for focusing said first light on an optical disk having a first thickness, and for focusing said second light on an optical disk having a second thickness different than that of said first thickness.

18. The optical head as in claim 17, wherein said means for focusing comprises an objective lens, and wherein said first thickness corresponds to a thickness of a reflective surface of a first optical disk of said optical disks and said second thickness corresponds to a thickness of a reflective surface of a second optical disk of said optical disks.

19. The optical head as in claim 18, wherein said fixed optical system includes a first detector for receiving said first light reflected from said reflective surface of said first optical disk, and a second detector for receiving said second light reflected from said reflective surface of said second optical disk.

20. The optical head as in claim 19, wherein said first detector includes a first light source for outputting said first light, and said second detector includes a second light source for outputting said second light.

21. The optical head as in claim 20, wherein said first detector includes a hologram element for deflecting said first light reflected from said first surface and for not affecting said first light output from said first light source, and
wherein said second detector includes said hologram element for deflecting said second light reflected from said second surface and for not affecting said second light output from said second light source.

22. The optical head as in claim 19, wherein said first detector and said second detector comprise a single, shared detector.

23. The optical head as in claim 18, wherein said movable optical system includes a wavefront-conversion element adjacent said objective lens for adjusting a wavefront of said second light.

24. The optical head as in claim 17, wherein said movable optical system is movable in a direction parallel to said first light.

25. The optical head as in claim 17, wherein said first light and said second light are parallel.

26. The optical head as in claim 17, wherein said first light and said second light have a common axis.

27. The optical head as in claim 17, wherein said fixed optical system includes a wavelength-combining device for combining said first light and said second light.

28. The optical head according to claim 27, wherein said fixed optical system includes a single collimator lens positioned to receive and collimate said first and second light from said wavelength-combining element, and for providing said first collimated light and said second collimated light to said movable optical system.

29. The optical head as in claim 17, wherein said movable optical system includes a wavelength-combining device for combining said first light and said second light.

30. The optical head according to claim 17, wherein said fixed optical system includes:
a wavelength-combining element for receiving said first light and said second light;
a single beam splitter for receiving an output from said wavelength-combining element;
a single collimator lens, positioned to receive an output from said beam splitter, for providing an output to said movable optical system; and
a single, shared detection system for receiving said first light and said second light reflected from a first optical disk and a second optical disk, respectively, of said different optical disks.

* * * * *